United States Patent
Madhvanath et al.

(10) Patent No.: US 9,292,112 B2
(45) Date of Patent: Mar. 22, 2016

(54) MULTIMODAL INTERFACE

(75) Inventors: Sriganesh Madhvanath, Karnataka (IN); Dustin Freeman, Ontario (CA)

(73) Assignee: Hewlett-Packard Development Company, L.P., Houston, TX (US)

(*) Notice: Subject to any disclaimer, the term of this patent is extended or adjusted under 35 U.S.C. 154(b) by 554 days.

(21) Appl. No.: 13/543,419

(22) Filed: Jul. 6, 2012

(65) Prior Publication Data

US 2013/0030815 A1 Jan. 31, 2013

(30) Foreign Application Priority Data

Jul. 28, 2011 (IN) ............................ 2684/CHE/2011

(51) Int. Cl.
*G06F 3/0488* (2013.01)
*G06F 3/038* (2013.01)
*G06F 3/0481* (2013.01)

(52) U.S. Cl.
CPC ............ *G06F 3/038* (2013.01); *G06F 3/04817* (2013.01); *G06F 3/04883* (2013.01); *G06F 2203/0381* (2013.01)

(58) Field of Classification Search
CPC ... G10L 15/22; G10L 2015/226; G10L 15/24; G06F 3/0487; G06F 3/0488; G06F 3/0489; G06F 3/048; G06F 3/017; G06F 3/04817; G06F 3/04883; G06F 2203/0381
USPC .................. 704/270, 275; 715/727, 810, 863
See application file for complete search history.

(56) References Cited

U.S. PATENT DOCUMENTS

| | | | |
|---|---|---|---|
| 6,014,142 A * | 1/2000 | LaHood ........................ 715/848 |
| 6,438,523 B1 * | 8/2002 | Oberteuffer ............ G06F 3/038 382/186 |
| 6,483,524 B1 * | 11/2002 | Petchenkine et al. ......... 715/763 |
| 6,590,584 B1 * | 7/2003 | Yamaura et al. .............. 715/704 |
| 7,289,645 B2 * | 10/2007 | Yamamoto ............. B60K 37/06 382/104 |
| 7,814,439 B2 * | 10/2010 | Fitzmaurice et al. ......... 715/856 |
| 8,064,704 B2 * | 11/2011 | Kim et al. ..................... 382/190 |
| 8,176,438 B2 * | 5/2012 | Zaman et al. ................. 715/815 |
| 8,428,643 B2 * | 4/2013 | Lin ............................... 704/235 |
| 8,869,073 B2 * | 10/2014 | Freeman ................. G06F 3/017 715/716 |
| 2009/0251441 A1 * | 10/2009 | Edgecomb et al. ........... 345/179 |
| 2010/0031180 A1 * | 2/2010 | Shin et al. ..................... 715/771 |
| 2010/0031203 A1 * | 2/2010 | Morris et al. ................. 715/863 |
| 2010/0050133 A1 * | 2/2010 | Nishihara et al. ............. 715/863 |
| 2010/0146464 A1 | 6/2010 | Wilson et al. |
| 2010/0153111 A1 | 6/2010 | Hirai et al. |
| 2010/0251119 A1 * | 9/2010 | Geppert et al. ............... 715/716 |
| 2010/0275159 A1 * | 10/2010 | Matsubara ............. G06F 3/011 715/810 |
| 2011/0102570 A1 | 5/2011 | Wilf et al. |
| 2011/0115702 A1 | 5/2011 | Seaberg |

(Continued)

OTHER PUBLICATIONS

Freeman et al., "Freehand Pose-based Gestural Interaction: Studies and Implications for Interface Design", IEEE Proceedings of 4th International Conference on Intelligent Human Computer Interaction, Kharagpur, India, Dec. 27-29, 2012, 6 Pages.*

(Continued)

*Primary Examiner* — Martin Lerner
(74) *Attorney, Agent, or Firm* — Hewlett-Packard Patent Dept.

(57) ABSTRACT

Provided is a multimodal graphical user interface. The multimodal graphical user interface includes a menu with at least one menu item, wherein the at least one menu item is displayed as command name along with a unique hand shape, wherein the at least one menu item is configured to receive a combination of cursor and selection gesture input.

17 Claims, 3 Drawing Sheets

(56) References Cited

U.S. PATENT DOCUMENTS

| | | | |
|---|---|---|---|
| 2011/0115728 A1* | 5/2011 | Kwak | G06F 3/0482 345/173 |
| 2011/0213773 A1* | 9/2011 | Kobayashi | 707/736 |
| 2011/0260962 A1* | 10/2011 | Benko et al. | 715/863 |
| 2011/0304541 A1* | 12/2011 | Dalal | 345/158 |
| 2012/0038652 A1* | 2/2012 | Yang | 345/467 |
| 2012/0044139 A1* | 2/2012 | Kim et al. | 345/157 |
| 2012/0124502 A1* | 5/2012 | Hoogerwerf et al. | 715/771 |
| 2012/0124516 A1* | 5/2012 | Friedman | 715/810 |
| 2012/0188164 A1* | 7/2012 | Dey | G06F 3/017 345/163 |
| 2012/0204120 A1* | 8/2012 | Lefar et al. | 715/757 |
| 2012/0282974 A1* | 11/2012 | Green | G08B 13/19689 455/550.1 |
| 2013/0031517 A1* | 1/2013 | Freeman | G06F 3/017 715/863 |
| 2013/0290911 A1* | 10/2013 | Praphul | G06F 3/017 715/863 |

OTHER PUBLICATIONS

"Search your android phones by written gesture", Android India; Aug. 6, 2010, http://indiaandroid.com/2010/08/search-your-android-phones-by-written-gesture/.

Tse, et al., "Enabling Interaction with Single User Applications through Speech and Gestures on a Multi-User Tabletop", AVI' O6, May 23, 26, 2006, Venezia, Italy, ACM, 2006; pp. 336-343.

* cited by examiner

MULTIMODAL INTERFACE

CLAIM FOR PRIORITY

The present application claims priority under 35 U.S.C. 119(a)-(d) to Indian Patent application number 2684/CHE/2011, filed on Jul. 28, 2011, which is incorporated by reference herein in its entirety.

BACKGROUND

In the early days of computing systems, human-computer interaction (HCI) was confined to a selected group of people comprising of engineers, developers, academicians and hobbyists. With the development of personal computer in 1980s and Graphical user interfaces (GUIs), HCI has changed significantly. Traditional input devices, such as keyboard and mouse are gradually being replaced with new interaction metaphors, such as gestures, touch, and speech. Considering the new interaction paradigms, user interfaces are being re-designed to accommodate user inputs from multiple input modes. As a result, it is not uncommon to find multiple user interfaces on a computer system each corresponding to a distinct interaction modality. For instance, a speech-based input system may require a user to interact with a speech-specific interface, whereas a gesture-based interaction system may require a different mechanism. This is not a desirable situation from a user's perspective, who might want to enjoy a multimodal interaction experience in the true sense which involves using multiple input modalities at the same time in a convenient and user friendly manner.

BRIEF DESCRIPTION OF THE DRAWINGS

For a better understanding of the solution, embodiments will now be described, purely by way of example, with reference to the accompanying drawings, in which.

DETAILED DESCRIPTION OF THE INVENTION

Advancements in technology paralleled with a reduced cost of ownership have led users to embrace new interaction metaphors over older accessory-based input methods. A multimodal interaction system provides a more natural and instinctive form of engagement with a computing device than traditional input based devices (such as keyboard or mouse). For instance, a speech-based input system is more intuitive to a lay user than a mouse-based system, which may require a longer learning curve. Similarly, a hand gesture-based system may provide a more natural form of engagement than a keyboard-based input.

Considering the shift in consumer preference, various devices, such as touch screen tablets and advanced gaming systems, have been launched that offer a user a mix of novel and familiar modes of user engagement. These devices offer a range of interaction modalities, namely touch, gestures and speech.

Notwithstanding the benefits it provides, a multimodal interaction system may require a user to interact with multiple user interfaces. For instance, there may be separate user interfaces for an interaction requiring touch, gesture and speech modalities. Needless to say, this could leave a user confused and unsure during his interaction with a multimodal system. It would be ideal if a user interface could be provided which is receptive to multiple input modalities and has a convenient to use form factor from a user's perspective.

Embodiments of the present solution provide a multimodal graphical user interface and a method that allows a user to interact with a computing device using the proposed multimodal graphical user interface.

For the sake of clarity, the term "Multimodal" refers to a system that provides a user with multiple modes of interfacing with the system. A multimodal interface provides several distinct tools for input and output of data.

Figure 1:
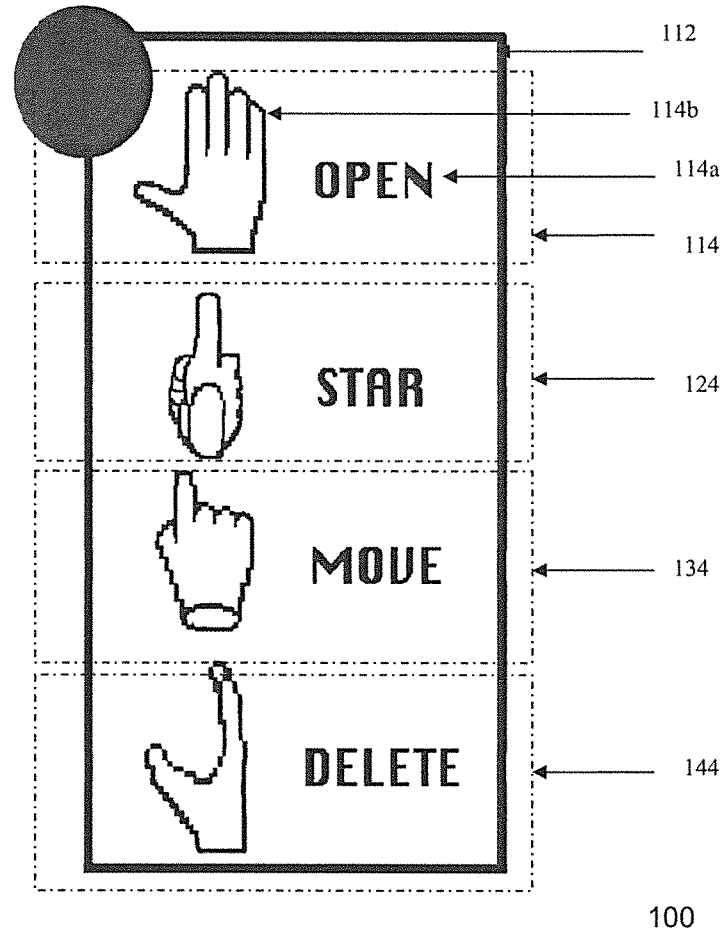
FIGS. 1, 2 and 3 show illustrates multimodal graphical user interfaces for a computing device, according to an embodiment.
Figure 2:
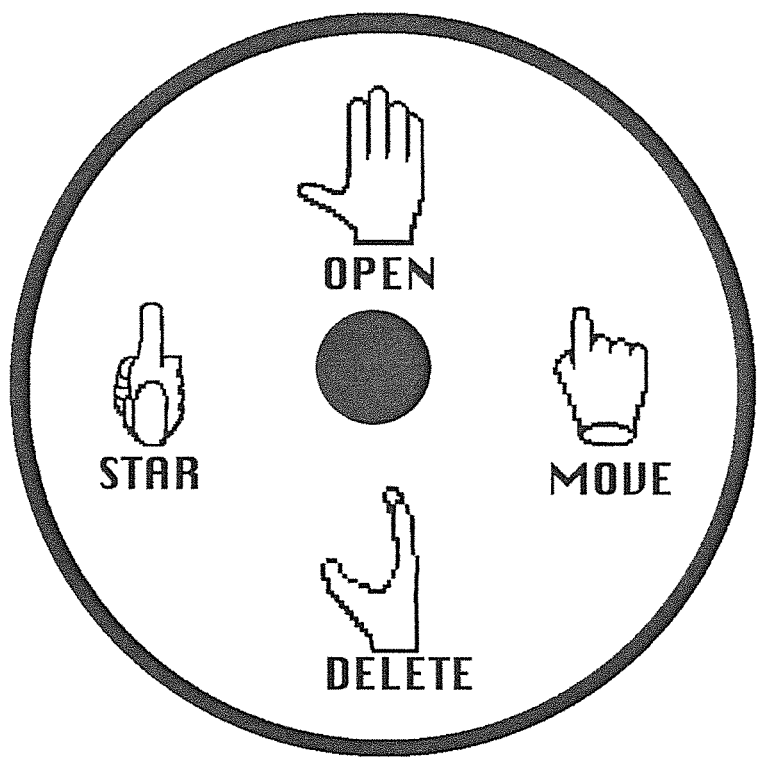
Figure 3:
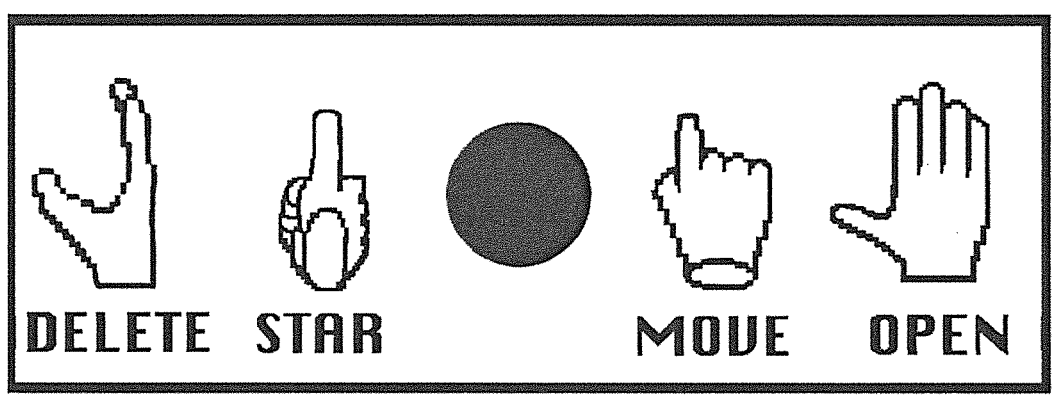

FIGS. 1, 2 and 3 show illustrative multimodal graphical user interfaces for a computing device, according to an embodiment. The representative figures (FIGS. 1, 2 and 3) provide various layouts that may be used to illustrate the proposed multimodal graphical user interface.

FIG. 1 illustrates a multimodal graphical user interface in a vertical menu layout, FIG. 2 illustrates a multimodal graphical user interface in a radial menu layout, and FIG. 3 illustrates a multimodal graphical user interface in a horizontal menu layout.

The multimodal graphical user interface of FIGS. 1, 2 and 3 may be implemented in the context of a computer application (including an operating system environment) present on a computing device (system), such as, but not limited to, a personal computer, a desktop computer, a laptop computer, a notebook computer, a network computer, a personal digital assistant (PDA), a mobile device, a hand-held device, a television (TV), and the like. The computer application could be a text processing application, a spreadsheet application, a presentation application, a photo browsing application, and so and so forth. The aforesaid list is mentioned for the purpose of illustration and not by way of limitation.

Additionally, the computing device may be connected to another computing device or a plurality of computing devices via a network, such as, but not limited to, a Local Area Network (LAN), a Wide Area Network, the Internet, or the like.

Coming back to FIG. 1, a multimodal graphical user interface 100 is provided. The multimodal graphical user interface 100 comprises a menu 112. The menu 112 includes at least one menu item 114. The menu may have multiple menu items as well, such as menu items 124, 134, and 144.

A menu item is displayed as command name along with a unique hand shape. In other words, a menu item includes a command text and an associated unique hand pose. In FIG. 1 each menu item (114, 124, 134, and 144) is displayed as command name along with a unique hand shape. For instance, menu item 114 includes a command name "Open" 114a and a hand shape 114b.

Command name in a menu item signifies a function which may be performed by a computing device in context of the application (or the operating system) employing the proposed multimodal interface (for example of FIG. 1). For instance, for menu item 114 (having command name "Open" 114a) an "opening" function (action) would be performed. The "opening" function could relate to opening of a text document in a text application, opening of an image file in a photo browsing application, opening of a presentation in a presentation application and so on and so forth. The function associated with a command name could be predefined in the computing system (or application) or it may be defined by a user.

Similarly, the hand shape in a menu item also signifies a function which may be performed by a computing device in context of the application (or the operating system) employing the proposed multimodal interface (for example of FIG. 1). A hand shape would perform the same function as performed by the command it is associated with in a menu item. For instance, for menu item 114, which includes the hand shape of an "open palm" 114b, an "opening" function would be performed similar to the one which may be performed for the text command next to it. Since both command name and hand shape are part of a menu item, by corollary a function associated with them is construed to be linked to the menu item.

A menu item in the multimodal user interface 100 is configured to receive a combination of cursor and gesture input (namely "selection gesture") from a user. For instance, if a user moves a cursor to a menu item (by using a pointing device, such as mouse or keyboard or through a hand or gaze movements, simulated on the display device) and then performs an air-tap gesture (the "selection gesture" in this case), the interface recognizes it as a user input. Once recognized, the function associated with the menu item is performed by the computer system. Air-tap is one possible instantiation of a "selection gesture" used to select the menu item under the cursor. Other could be a snap of the fingers, a grabbing action, a pulling action, or simply dwelling in the same place for a certain period of time. The aforesaid list is mentioned for the purpose of illustration and not by way of limitation.

In another instance, a menu item in the multimodal user interface 100 is configured to receive a speech input. If a microphone is attached to a computer system displaying the multimodal user interface 100, the interface could recognize a speech command corresponding to a command name in a menu item. Upon recognition, the function associated with the menu item is executed by the computer system. To provide an illustration, if the word "Open" is spoken by a user while interfacing with the multimodal user interface 100, a file or directory may be opened (depending upon the context of the application utilizing the interface) and displayed to the user. Similarly, if the word "Delete" is recognized by the computing device, the multimodal user interface 100 may construe it to mean a command related to deletion of a file and act accordingly.

In a yet another instance, a menu item in the multimodal user interface 100 is configured to receive a hand shape gesture input. A camera attached (removably or non-removably) to a computer system displaying the multimodal user interface 100 may be used to track and capture the shape (or movement) of a user's hand. The captured image(s) is/are analyzed by the computer system. If it is determined that there is a hand shape (in the captured image data) corresponding to a hand shape in a menu item of the multimodal graphical user interface, the function associated with the menu item is executed by the computer system. To provide an illustration with reference to FIG. 1, if a user makes an "open palm" hand pose, a computer system (with a camera) displaying the multimodal user interface 100 may recognize the hand pose. Upon recognition, if it is determined that there is a corresponding hand shape in a menu item of the multimodal graphical user interface 100, the function associated with the menu item would be performed. In this case, an "open palm" hand shape is connected with an "Open" function, therefore, a file or directory may be opened and displayed to the user.

Similarly, to perform other functions in the menu 112, a user simply needs to make the unique hand shape gesture associated with a menu item (124, 134 or 144).

The multimodal graphical user interface 100 may not be limited to a single level menu. The interface could be extended to multiple level menus, for example a first level sub-menu, a second level sub-menu and so and so forth. In an example, at least one menu item may further include at least one sub-menu item. Each sub-menu item may be displayed as a command name along with a unique hand shape. Also, like the main menu item, each sub-menu item would be configured to receive a combination of cursor and selection gesture input, a speech input and/or a hand shape gesture input from a user.

The multimodal graphical user interface (GUI) 100 may be displayed in the form of a window GUI with at least one menu and at least one menu item. The menu may be a fixed design menu or a context menu.

FIGS. 2 and 3 illustrates a multimodal graphical user interface in a radial and a horizontal menu layout respectively. Both figures illustrate the multimodal graphical user interface 100 of FIG. 1, however, in different layouts. The description of multimodal graphical user interface 100 in the context of FIG. 1 applies to FIGS. 2 and 3 as well.

Figure 4:
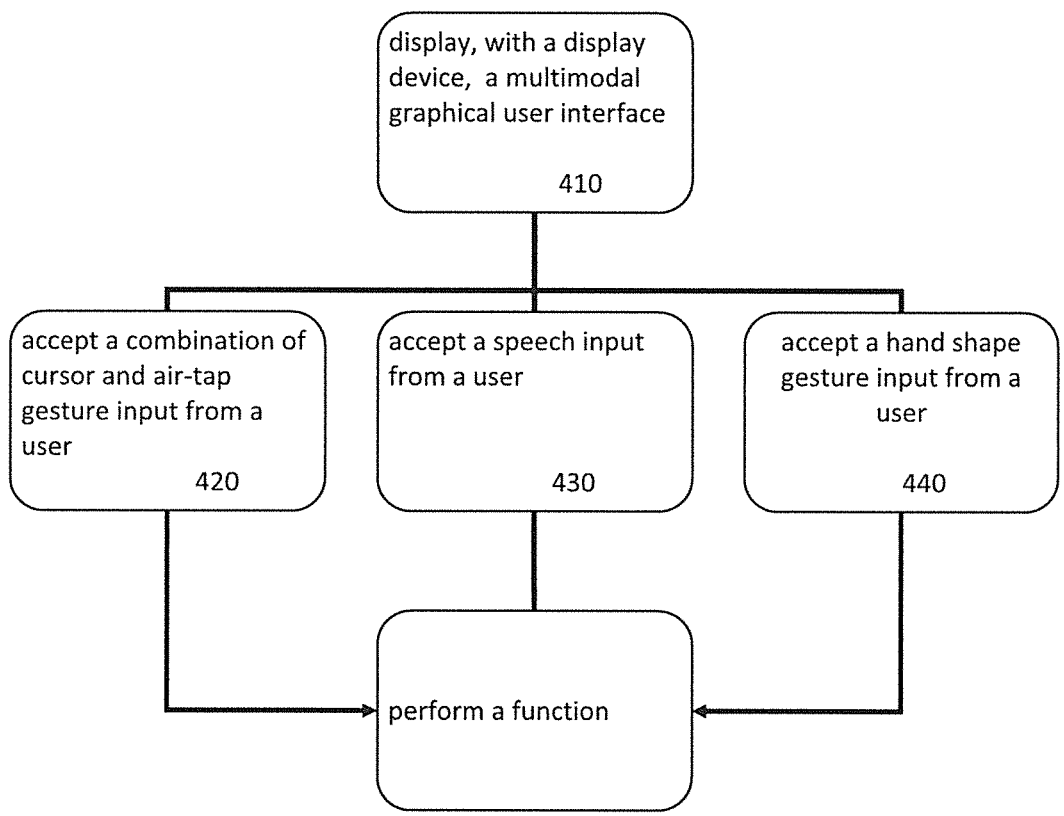
FIG. 4 shows a flow chart of a method for allowing a user to interface with a computing device having a multimodal graphical user interface of FIG. 1, 2 or 3, according to an embodiment.

FIG. 4 shows a flow chart of a method for allowing a user to interface with a computing device having a multimodal graphical user interface of FIG. 1, 2 or 3, according to an embodiment.

Block 410 involves displaying, with a display device, a multimodal graphical user interface, as illustrated in FIG. 1, 2 or 3, or as described above in the context of FIG. 1. The multimodal graphical user interface could be displayed in a display device which may be removably or non-removably attached to a computing device (such as, but not limited to, a personal computer, a desktop computer, a laptop computer, personal digital assistant (PDA) and a mobile device).

The multimodal graphical user interface may be used (and displayed) for interfacing with a computer application (including an operating system). The multimodal graphical user interface may comprise a menu. The menu may include at least one menu item. Each menu item is displayed as command name along with a unique hand shape.

Block 420 includes accepting a combination of cursor and selection gesture input from a user for selecting at least one menu item in a menu of the displayed multimodal graphical user interface.

In an example, a user's finger may act as a pointing device whose position relative to the computing device is captured through a camera. The camera tracks a user's hand, which is represented as a cursor on the interface. If a user's wants to move a cursor to a particular part of the interface, all he needs to do is to move his hand. For instance, if a user wants to "Insert" an item in a document, he could simply move his to move the cursor to the "Insert" item in the menu of the word processing application.

In the present case, a cursor input involves a user moving a cursor to the at least one menu item in the multimodal interface to indicate his intention of selecting a menu item. Once the cursor is placed on a menu item, a user may select the item by performing a selection gesture, for instance, an air-tap gesture. An air-tap gesture involves a user tapping the air subsequent to aforesaid cursor movement (or placement). The selection gesture (air-tap) is interpreted by the interface as a user command to perform the function associated with the menu item. Once the command is recognized, the function associated with the menu item is executed. In the context of above illustration, after a cursor has been moved to the "Insert" item, a user is only requited to perform an air-tap gesture for the interface to execute an "insert action". The "insert action" may involve displaying a sub-menu listing the items (for e.g. image, animation, file, drawing, etc.), which a user may insert.

Block 430 includes accepting a speech input from a user for selecting at least one menu item in a menu of the displayed multimodal graphical user interface.

A menu item may be displayed as command name along with a unique hand shape. For instance, menu item 114 includes a command name "Open" 114a and a hand shape 114b. A menu item in the multimodal user interface is configured to receive a speech input. If a microphone is attached to a computer system displaying the multimodal user interface, the interface could recognize a speech command corresponding to a command name in a menu item. Upon recognition, the function associated with the menu item is executed by the computer system. To provide an illustration, if the word "Open" is spoken by a user while interfacing with the multimodal user interface 100, a file or directory may be opened (depending upon the context of the application utilizing the interface) and displayed to the user. All that is needed is that the speech input should correspond to a command name in a menu item. The command would be executed.

Block 440 includes accepting a hand shape gesture input from a user for selecting at least one menu item in a menu of the displayed multimodal graphical user interface.

A menu item may be displayed as command name along with a unique hand shape. For instance, menu item 114 includes a command name "Open" 114a and a hand shape 114b. A menu item in the displayed multimodal user interface is configured to receive a hand shape gesture input. A camera attached (removably or non-removably) to a computer system displaying the multimodal user interface may be used to track and capture the shape (or movement) of a user's hand. The captured image(s) is/are analyzed by the computer system. If it is determined that there is a hand shape (in the captured image data) corresponding to a hand shape in a menu item of the multimodal graphical user interface, the function associated with the menu item is executed by the computer system. To provide an illustration with reference to FIG. 1, if a user makes an "open palm" hand pose, a computer system (with a camera) displaying the multimodal user interface 100 may recognize the hand pose. Upon recognition, if it is determined that there is a corresponding hand shape in a menu item of the multimodal graphical user interface 100, the function associated with the menu item would be performed. In this case, an "open palm" hand shape is connected with an "Open" function, therefore, a file or directory may be opened and displayed to the user.

Aspects of interface solution highlighted under Blocks 420, 430 and 430 may be performed simultaneously, in various combinations, sequentially in any order or separately. For example, a user may interface with the multimodal user interface of FIGS. 1, 2 and 3, either through a cursor and air-tap combination in conjunction with an audio input; through a cursor and a hand shape gesture input; through a combination of an audio command and a hand shape gesture input; only through a cursor and air-tap combination; only through an audio input; only through a hand shape gesture input, and so and so forth. In other words, various input modalities (cursor movement, air-tap gesture, audio input and hand gesture input) may be combined together in various ways to interface with the disclosed multimodal gesture user interface. An advantage for employing different combinations of input modalities is that it allows various users to use the multimodal graphical interface as per their requirement. For example, novice users may want to use the cursor plus gesture style and later graduate to hand poses. The aforesaid list is mentioned for the purpose of illustration and not by way of limitation.

It will be appreciated that the embodiments within the scope of the present solution may be implemented in the form of a computer program product including computer-executable instructions, such as program code, which may be run on any suitable computing environment in conjunction with a suitable operating system, such as Microsoft Windows, Linux or UNIX operating system. Embodiments within the scope of the present solution may also include program products comprising computer-readable media for carrying or having computer-executable instructions or data structures stored thereon. Such computer-readable media can be any available media that can be accessed by a general purpose or special purpose computer. By way of example, such computer-readable media can comprise RAM, ROM, EPROM, EEPROM, CD-ROM, magnetic disk storage or other storage devices, or any other medium which can be used to carry or store desired program code in the form of computer-executable instructions and which can be accessed by a general purpose or special purpose computer.

It should be noted that the above-described embodiment of the present solution is for the purpose of illustration only. Although the solution has been described in conjunction with a specific embodiment thereof, numerous modifications are possible without materially departing from the teachings and advantages of the subject matter described herein. Other substitutions, modifications and changes may be made without departing from the spirit of the present solution.

We claim:

1. A system comprising:
   a processor; and
   a memory storing program instructions, which when executed by the processor cause the system to generate a multimodal graphical user interface, the multimodal graphical user interface comprising a display of a menu of a plurality of different selectable menu items, wherein the display of each of the plurality of different selectable menu items includes a command name and a unique hand shape corresponding to the command name,
   wherein one of the plurality of different selectable menu items is selected when the menu item receives a combination of a cursor input and a selection gesture input, wherein the selection gesture input includes an air-tap gesture.

2. The system of claim 1, wherein each of the plurality of different selectable menu items is selected in response to a speech input.

3. The system of claim 2, wherein the speech input includes the command name.

4. The system of claim 1, wherein each of the plurality of different selectable menu items is selected in response to a hand shape gesture input.

5. The system of claim 4, wherein the hand shape gesture input corresponds to the unique hand shape in the menu.

6. The system of claim 1, wherein the selection gesture input further includes a snap of fingers.

7. The system of claim 1, wherein the one of the plurality of different selectable menu items further includes at least one sub-menu item, wherein the at least one sub-menu item is displayed as another command name and another unique hand shape, wherein the at least one sub-menu item is selected in response to a combination of the cursor input and the air-tap gesture input.

8. The system of claim 7, wherein the at least one sub-menu item is selected in response to a speech input.

9. The system of claim 8, wherein the speech input includes the command name.

10. The system of claim 7, wherein the at least one sub-menu item is selected in response to a hand shape gesture input.

11. The system of claim 10, wherein the hand shape gesture input corresponds to the another unique hand shape in the sub-menu item.

12. The system of claim 1, wherein the plurality of different selectable menu items is displayed in at least one of the following layouts: radial, vertical and horizontal.

13. A method for allowing a user to interface with a computing device, comprising:

displaying, with a display device, a multimodal graphical user interface, wherein the multimodal graphical user interface comprises a display of a menu of a plurality of different selectable menu items, wherein the display of each of the plurality of different selectable menu items includes a command name and a unique hand shape corresponding to the command name;

accepting, by the computing device, a combination of a cursor input and an air-tap gesture input for selecting one of the plurality of different selectable menu items, wherein the cursor input comprises a user moving a cursor to the selected menu item and the air-tap gesture input comprises the user tapping the air subsequent to aforesaid cursor movement; and performing, by the computing device, a function associated with the selected menu item.

14. The method of claim 13, further comprising:

accepting, by the computing device, a combination of the cursor input and a snap of fingers for selecting the one of the plurality of different selectable menu items.

15. A method for allowing a user to interface with a computing device, comprising:

displaying, with a display device, a multimodal graphical user interface, wherein the multimodal graphical user interface comprise a display of a menu of a plurality of different selectable menu items, wherein the display of each of the plurality of different selectable menu items includes a command name and a unique hand shape corresponding to the command name;

accepting, by the computing device, a combination of a cursor input and another input for selecting one of the plurality of different selectable menu items, wherein the another input comprises an air-tap gesture; and performing, by the computing device, a function associated with the selected menu item.

16. The method of claim 15, wherein the another input further includes a hand shape gesture input corresponding to the unique hand shape in the plurality of different selectable menu items.

17. The method of claim 15, wherein the another input further includes a snap of fingers.

* * * * *